F. M. ASHLEY.
VEHICLE TIRE.
APPLICATION FILED FEB. 12, 1910.
1,035,138.
Patented Aug. 13, 1912.
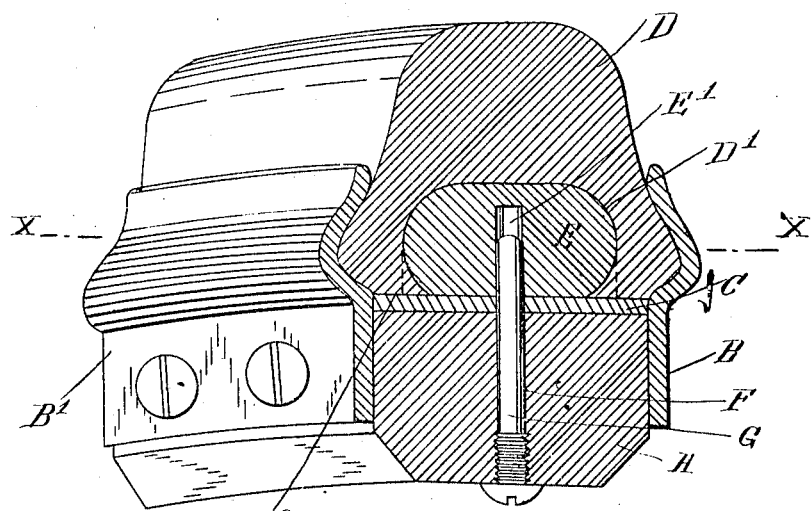
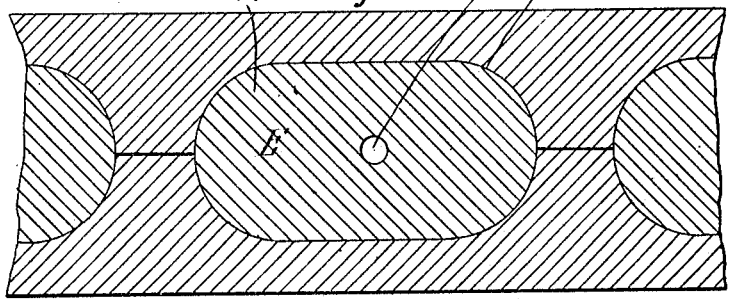
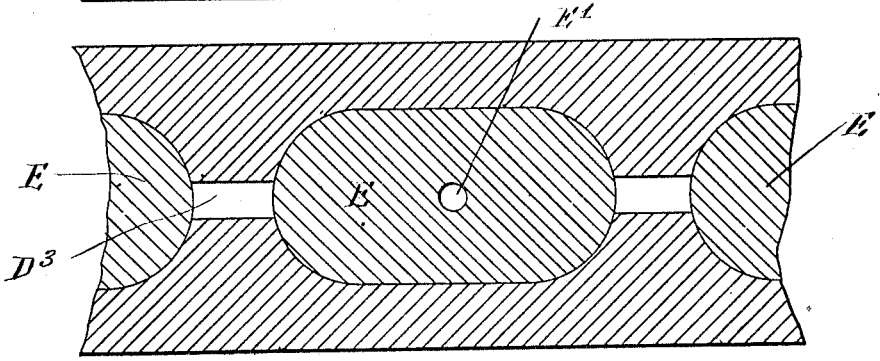

UNITED STATES PATENT OFFICE.

FRANK M. ASHLEY, OF NEW YORK, N. Y.

VEHICLE-TIRE.

1,035,138.  Specification of Letters Patent.  Patented Aug. 13, 1912.

Application filed February 12, 1910. Serial No. 543,463.

*To all whom it may concern:*

Be it known that I, FRANK M. ASHLEY, a citizen of the United States, and a resident of New York city, borough of Brooklyn, in the county of Kings and State of New York, have invented certain new and useful Improvements in Vehicle-Tires, of which the following is a specification.

My invention relates to vehicles, and the object of my invention is to provide a tire for vehicles, and means for holding said tire securely on the wheel.

A further object is to provide a tire at a less cost than tires of this type have heretofore been produced for.

My invention consists in the combination of parts hereinafter set forth and particularly pointed out in the claims.

Referring to the drawings, Figure 1 illustrates a section of a wheel and tire and presenting an end view in cross section. Fig. 2 is a sectional plan view of the tire and filling blocks on line $x$—$x$ of Fig. 1, as they appear when clamped between the clamping plates to the felly of the wheel. Fig. 3 is a sectional plan view on line $x$—$x$ of Fig. 1, illustrating the relative position of the tire and filling blocks before being clamped between the clamping plates to the felly of the wheel.

Referring to Fig. 1, A indicates the felly of a wheel to which are bolted one on each side, clamping plates B and B' respectively.

C indicates a metal band which extends around the wheel and closely fits the periphery of the felly A.

D indicates a tire preferably made of vulcanized rubber and is formed with pockets D' spaced apart from each other at predetermined distances in the base of the tire, and located in said pockets are filling blocks E provided with holes E' preferably located at the center of the block as illustrated.

In making the tire I vulcanize the tire without the blocks being located in the tire, but form the pockets by molding them, and afterward insert the blocks in the pockets as shown.

When the tire is formed, its base portion D² is divided circumferentially as indicated at D³ so that the base of the tire can be opened sufficiently to introduce the blocks E. After the blocks are introduced, the tire is placed in position on the felly of the wheel and clamped between the plates B and B' in such a manner as to force the rubber constituting the base of the tire firmly together as illustrated in Fig. 2 to close the opening D³. It will be noticed that the rubber is of greater thickness on the dotted line $x$—$x$ of Fig. 1 between the clamping plates and the block E than it is directly above this line, so that when the plates B and B' are clamped to the felly, the tire will not be pulled from its position.

I prefer to form the blocks E with rounded sides and ends so that no sharp corners will be formed which might cause the tire when under stress to tear. By placing the blocks apart from each other the rubber of the tire fills the intervening spaces and thereby divides the tire into a series of sections of solid rubber and rubber and block material. By this arrangement, the tire is stronger and better resists the strain placed upon it in practice, than would be the case were the blocks abutting each other and the side strain of the tire entirely borne by the section of the tire corresponding to the thickness between the blocks E and plate B or B'.

To prevent the tire from creeping, a hole F is driven through the felly and band C and registering with the aperture E' in the block E, and a bolt G is screwed into the felly and its ends project into the aperture E' in block E. As many bolts G as necessary may be used and by this means the tire is prevented from creeping, and a portion of the pull on the tire when in use is resisted by the bolts G, and by this the tendency of the tire to creep is further prevented.

By use of the filling blocks as above described, I reduce the weight of the tire by the difference between the weight of the rubber and the weight of the blocks used which are preferably made of wood, but may be made of any suitable material. The use of these blocks also reduces the cost of the tire by the difference between the amount of rubber saved in the construction less the cost of making the wood blocks.

Having thus described my invention what I claim as new and desire to secure by Letters Patent is:

1. A tire made of flexible material, having pockets formed in the base thereof and spaced apart from each other at predetermined distances, and longitudinal openings in the base of the tire between the said pockets, filling blocks of non-flexible material removably contained in and filling said pockets, and means for closing the said longitudinal openings in the base of the tire and to holding the said filling blocks in said pockets.

2. A tire made of flexible material, having pockets molded in the base thereof, and longitudinal openings in the base of the tire between said pockets, blocks of non-flexible material adapted to be contained in and to fill said pockets but capable of ready removal therefrom, and clamping means adapted to close the said openings and to clamp the said blocks and the surrounding walls of flexible material firmly together.

3. In combination with the felly of a wheel, a surrounding band, a tire mounted upon said band having a plurality of pockets opening toward said band, a plurality of filling blocks having rounded sides and corners removably placed in said pockets and bearing against the said band, and means for securing the said blocks, band and felly together and for securing the tire to the felly.

4. In combination with the felly of a wheel, a surrounding band, a tire mounted upon said band having a plurality of pockets opening toward said band, and formed with longitudinal openings between the said pockets extending partly through the tire, a plurality of rounded blocks removably placed in said pockets and resting upon said band, means for clamping said blocks in said tire and for closing said longitudinal openings and for securing the tire to the felly.

Signed at New York city in the county of New York and State of New York this 10th day of February A. D. 1910.

FRANK M. ASHLEY.

Witnesses:
MINNIE S. MILLER
J. MERWIN.